US005638154A

United States Patent [19]

Chmielnik

[11] Patent Number: 5,638,154

[45] Date of Patent: Jun. 10, 1997

[54] PRINTING PLATE MOUNTING DEVICE

[75] Inventor: Reinhold Chmielnik, Bolton, Canada

[73] Assignee: Napp Systems, Inc., San Marcos, Calif.

[21] Appl. No.: 350,100

[22] Filed: Nov. 29, 1994

[51] Int. Cl.[6] .......................... G03B 27/52; G03B 27/02; G03B 27/32

[52] U.S. Cl. ............................... 355/40; 355/79; 355/43; 355/77

[58] Field of Search ................................ 355/40, 41, 44, 355/112, 113, 114, 132, 72, 79, 133, 125, 75; 352/97, 51; 101/12, 170, 383, 464, 463.1, 473; 430/360, 22

[56] References Cited

U.S. PATENT DOCUMENTS

| | | | |
|---|---|---|---|
| 3,046,835 | 7/1962 | Richards | 352/52 |
| 3,494,695 | 2/1970 | Sollima et al. | 355/53 |
| 3,497,705 | 2/1970 | Adler | 355/53 |
| 3,506,343 | 4/1970 | Dejoux | 352/52 |
| 3,541,338 | 11/1970 | Duda et al. | 355/53 |
| 3,576,365 | 4/1971 | Callum | 355/43 |
| 3,732,009 | 5/1973 | Callum | 355/43 |
| 3,888,572 | 6/1975 | Dejoux | 352/51 |
| 3,941,463 | 3/1976 | Wetzel et al. | 352/50 |
| 3,947,116 | 3/1976 | Dewaele | 355/40 |
| 4,150,991 | 4/1979 | Dillow | 96/41 |
| 4,626,097 | 12/1986 | Uchida | 355/77 |

*Primary Examiner*—Arthur T. Grimley
*Assistant Examiner*—Herbert V. Kernes
*Attorney, Agent, or Firm*—Pretty, Schroeder, Brueggemann & Clark; Stephen E. Reiter

[57] ABSTRACT

A novel printing plate mounting device and procedure are provided. A small-scale single-color representation of a carton blank or other substrate and a complete usually multi-color image to be printed thereon is projected from an acetate film or other suitable substrate onto a carrier sheet to provide a full-scale single-color representation of the substrate and the image to be printed thereon. A small-scale usually multi-color representation of the carton blank and the complete usually multi-color image to be printed thereon is used as a template to determine which ones of a plurality of individual printing plate elements is used to print which ones of the color of the multi-color image. The individual printing plate elements for each color then are affixed to separate carrier sheets in the position shown by the full-scale single-color representation.

9 Claims, 4 Drawing Sheets

PRINTING PLATE MOUNTING DEVICE

FIELD OF INVENTION

The present invention relates to a field of printing, and, in particular, to the mounting of printing plates on a printing plate carrier.

BACKGROUND TO THE INVENTION

In the printing of packaging with multi-color images, individual printing plates are prepared for each individual color to be printed and the individual color images are printed onto the recipient surface, for example, a paperboard or corrugated sheet from which a carton is to be produced, to produce the overall desired multi-color image on the recipient surface.

In order for the correct desired image to be printed on the recipient surface, it is necessary to properly mount the individual color printing plates on a carrier sheet. With flexographic printing plates, often such printing plates are made up of relatively small flexographic printing plate elements, particularly for cartons with large imprinted portions.

Attempting to ensure that the printing plate elements are correctly positioned on the carrier sheet is a time-consuming operation requiring considerable skill. For each individual color to be printed, it is necessary first for the mounter to draw the outline of the carton which is to be printed on a mounting carrier sheet as well as the location of the various score lines and then determining the intended location of the printing image for the specific color for which the mounter is preparing the printing plate by measurement. The mounter then affixes the individual flexographic printing plate elements to the locations on the printing blanket determined in this way. The procedure is repeated for each individual color to be printed to provide individual one-color printing plates, which then are mounted on the printing machine for printing the recipient surface.

As well as being time consuming, the mounting operation requires skill to locate the flexographic printing plate elements in the correct location on the carrier sheet once the outline has been drawn and the measurements have been made on the carrier sheet. The exact positioning of the elements is determined visually by the mounter and may be inaccurate.

SUMMARY OF INVENTION

The present invention provides a significantly improved printing plate mounting device and procedure which greatly decreases mounting time and which provides a high degree of accuracy of register of the flexographic printing plate elements.

Accordingly, in one embodiment, the present invention provides a printing plate mounter, which comprises means for projecting a small-scale single-color representation of a substrate onto which printing is to be effected, such as a carton blank, and a usually multi-color but possibly single-color image to be printed thereon onto a printing plate element recipient surface, such as a carrier sheet, to provide a full-scale single-color representation of the substrate and the image to be printed thereon. Once such full-scale representation is provided, the mounter is able to determine, in conjunction with a small-scale multi-color or single-color (as the case may be) representation of the substrate, with complete accuracy which particular printing plate element is required for each color of the multi-color image (if the image is multi-color) and the precise location for each such printing plate element.

Unlike the prior art, no drawing out of the outline and score lines of the carton blank is required nor are multiple measurements required to determine the locations of the printing plate elements. The full-scale projected image provides complete accuracy with respect to location of the printing elements. The magnification of the representation may be adjusted, so that the overall scale of the representation may be altered. Such magnification adjustment also may be used to ensure that the measurements of the full-scale representation are correct using dimensions indicated in the representation.

The novel printing plate mounter provided herein may be employed in a novel method for mounting of one-color printing plates on a carrier sheet in a desired pattern corresponding to a one-color or multi-color image desired to be printed on a recipient surface, such as a carton blank.

A small-scale single-color representation of a substrate, such as a carton blank, is provided, such as on an acetate film. A plurality of printing plate elements, usually flexographic printing plate elements, is provided for each color of the multi-color or single-color image to be printed on the substrate.

The small-scale single-color representation then is enlarged and projected onto a printing plate element recipient surface, such as a carrier sheet, to provide a full-scale single-color projected representation of the substrate on the recipient surface. Usually, the mounting machine is preset so that the enlargement factor of the small-scale representation the large scale representation results in an accurate full-scale representation. However, adjustment of the enlargement factor may be provided and the true nature of the full-scale representation checked by measurement to ensure the dimensions of the full-scale representation are those intended. In addition, the adjustment of the enlargement factor enables the same small scale representation to be employed for smaller or larger full-scale representations, based on altered desired dimensions of the substrate.

A small-scale multi-color representation of the substrate and the complete multi-color image to be printed thereon also is provided, usually as a paper print of the representation and multi-color image. This small-scale multi-color representation provides a template to determine which of the printing plate elements is intended to print which color on the printed substrate. The small-scale single-color representation and the small-scale multi-color representation may be provided by first computer-generating a small-scale multi-color representation and printing out a one-color version, which may be black line on transparent or transparent line or black, as desired, on an acetate film and printing out a multi-color version on paper.

The full-scale representation of the substrate and the individual printing plate elements are compared with the small-scale multi-color representation in order to determine which of the printing plate elements is used for printing which color of the image.

The individual printing plate element or elements for a first color is attached to the recipient surface in the location or locations shown by the projected full-scale representation and the small-scale multi-color or single-color representation for printing the first color. The attaching step then is repeated for the individual printing plate element or elements for each additional color of a multi-color image. In this way, a plurality of carrier sheets is provided each bearing the printing plate elements for the specific color to be printed by such elements in the correct location.

The carrier sheets then are positioned on respective printing cylinders on a printing machine in order to print the substrate with the desired multi-color or one-color image in registry thereon.

DESCRIPTION OF PREFERRED EMBODIMENT

Figure 1:
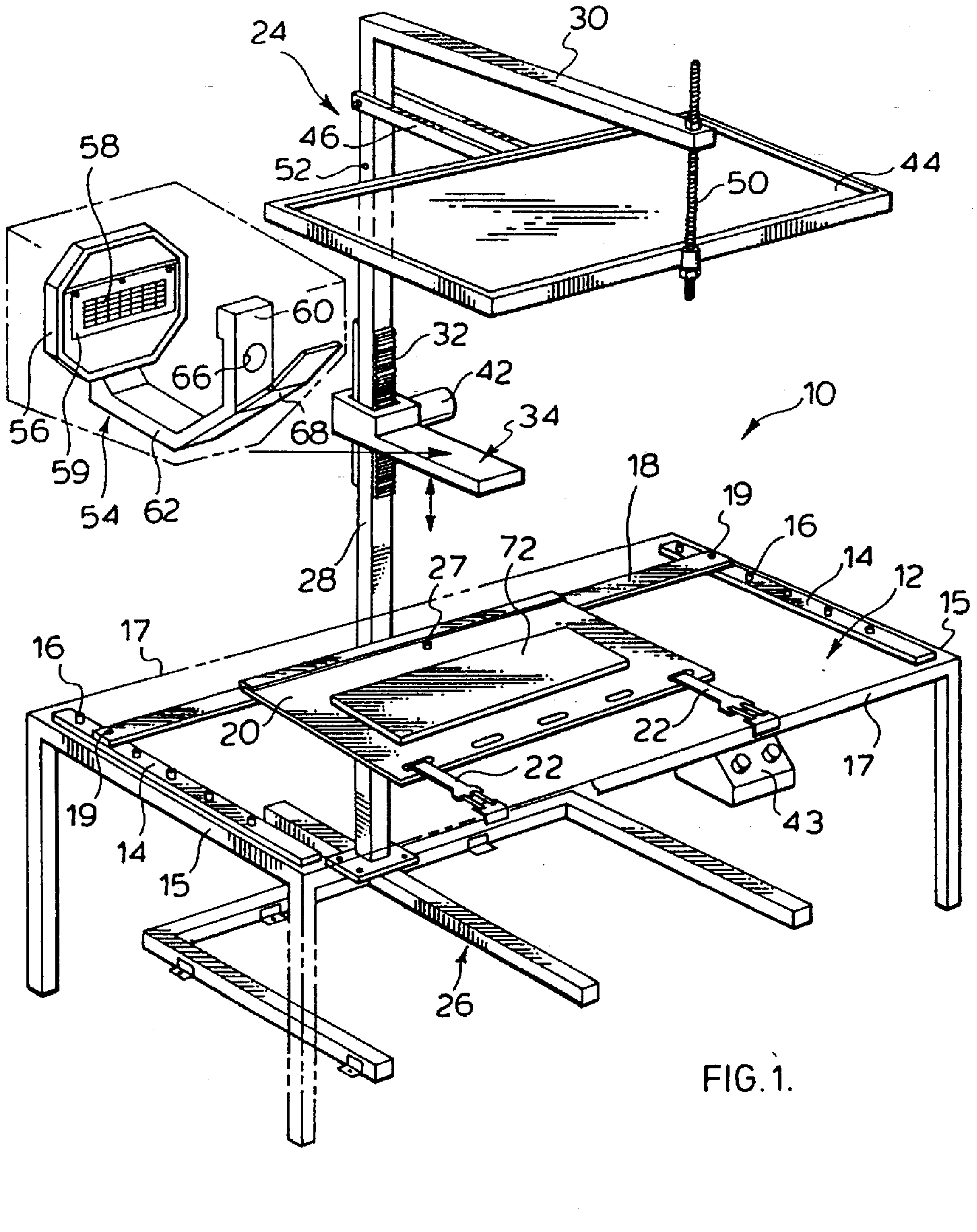
FIG. 1 is a perspective view of a printing plate mounting device in accordance with one embodiment of the invention.
Figure 2:
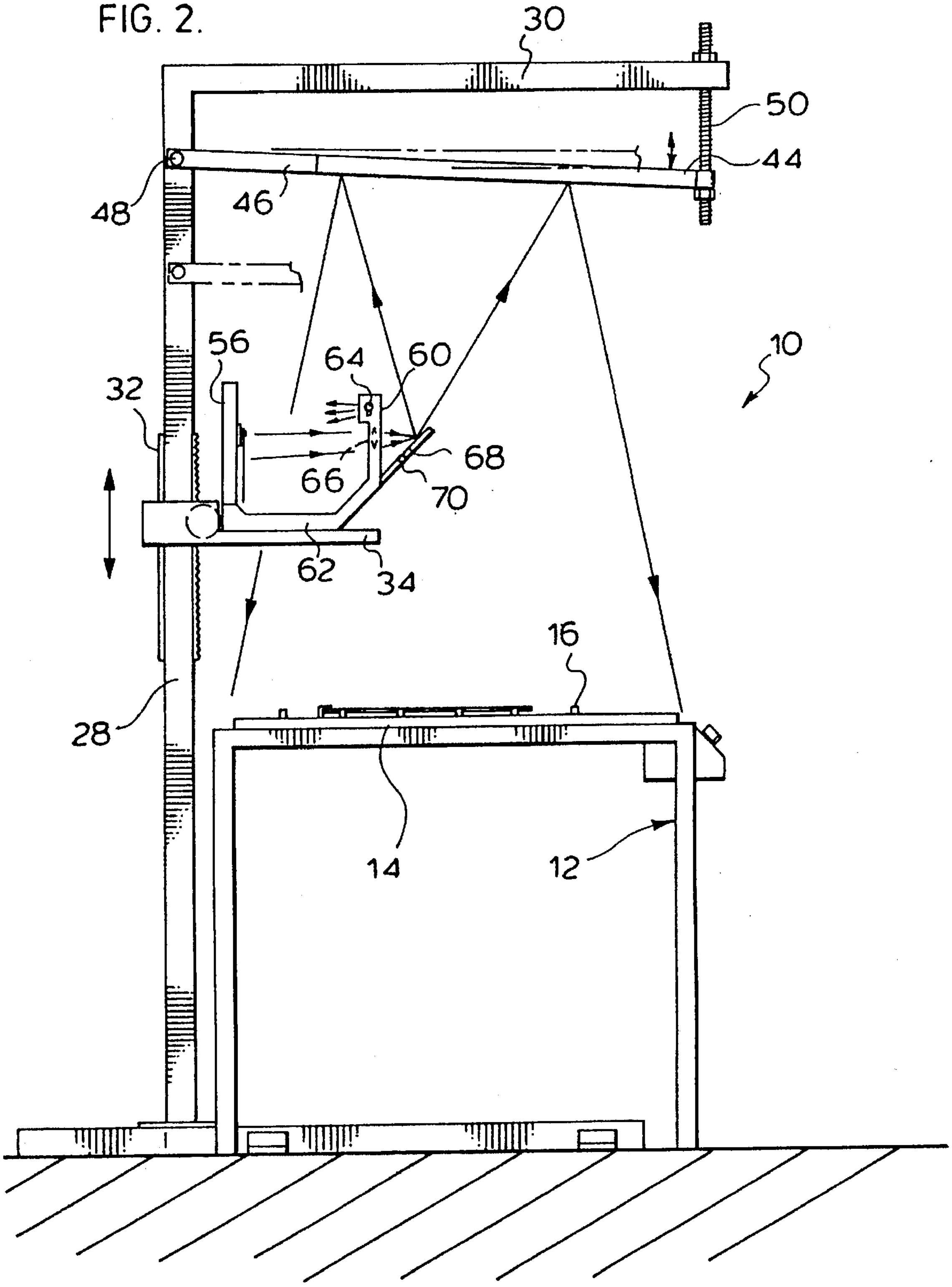
FIG. 2 is a side elevational view of the device of FIG. 1.
Figure 3:
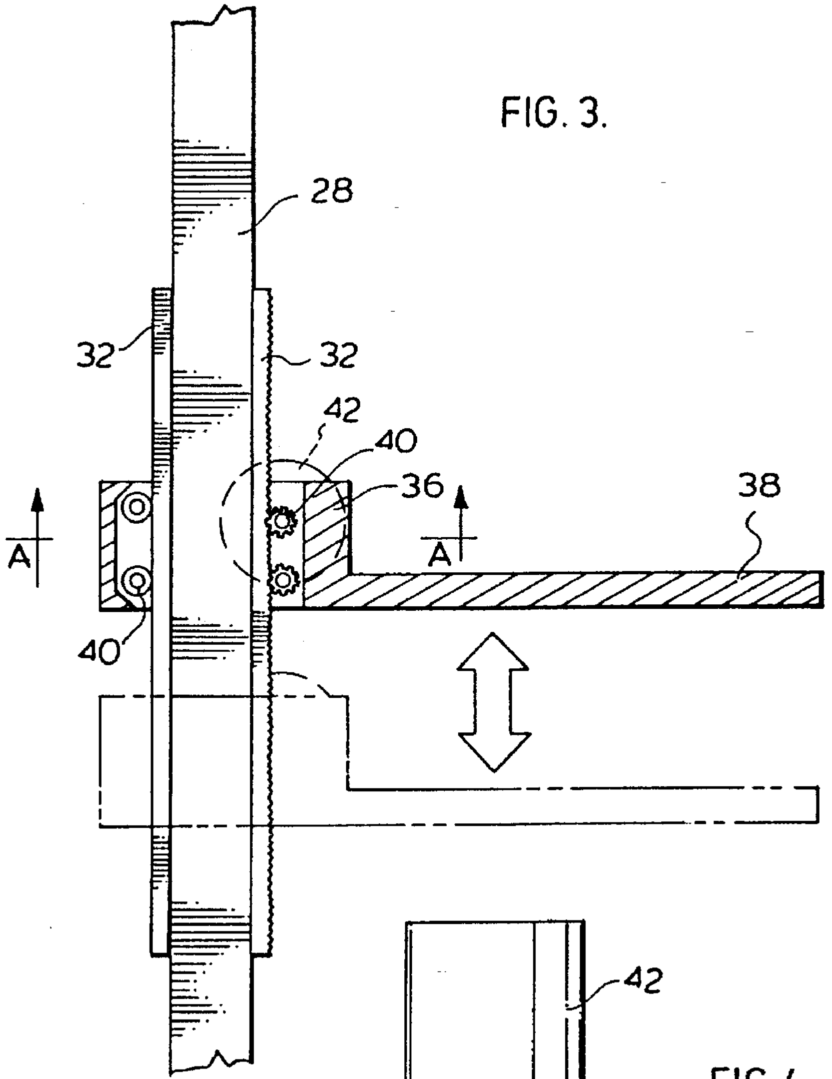
FIG. 3 is a side elevational, part-sectional view of a detail of the device of FIG. 1 taken on line A—A of FIG. 4.
Figure 4:
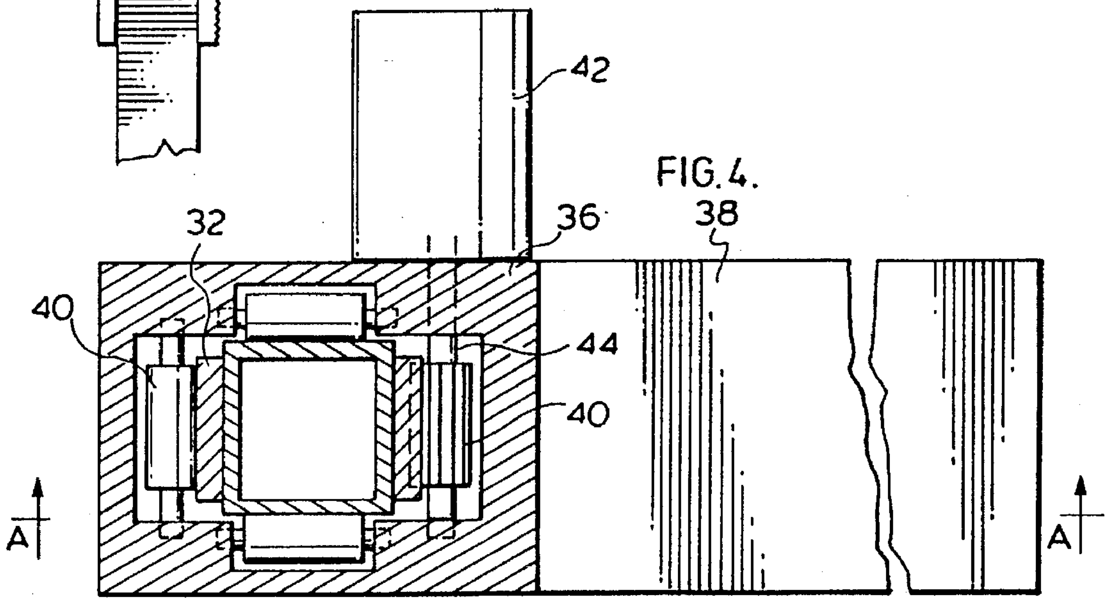
FIG. 4 is a sectional view of a detail of the device of FIG. 1, taken on line A—A in FIG. 3.

Referring to the drawings, a printing plate mounting device 10 comprises a horizontal table 12. The table 12 has a pair of elongate bars 14 provided along the lateral sides 15 of the table 12, each of which has a plurality of upward protrusions 16, arranged in pairs aligned in parallel to the longitudinal sides 17 of the table 12.

The pairs of the bars 14 and aligned protrusions permit a mounting bar 18 with openings 19 therethrough to accommodate a pair of the protrusions 16. This mounting bar 18 enables a carrier sheet 20 to be hooked thereon as the carrier sheet 20 would be hooked onto a printing machine. A centering pin 21 mounted to the bar 18 is received through the carrier sheet 20. Mounting straps 22 of the carrier sheet 20 are hooked onto the longitudinal edge 17 of the table 12 opposite to the mounting bar 18, again as in a printing machine. The mounting bar 18 is adjustable in location on table 12 by virtue of the pairs of protrusions 16 to permit different sizes of carrier sheet 20 to be mounted on a table 12. The table 12 is provided with a width sufficient to accommodate various widths of carrier sheet 20.

The illustrated embodiment of the invention uses a flat horizontal table 12 on which to mount the printing plate on the carrier sheet 20. This arrangement requires that the image which is projected onto the carrier sheet 20 be distorted in order to take into account the curvature of the printing cylinder of the printing press to which the carrier sheet 20 is to be attached for printing the image. However, the horizontal table may be replaced by a cylindrical structure corresponding in diameter to the diameter of the printing cylinder, on which the carrier sheet 20 then is mounted.

The device 10 further includes an upright frame 24 located to the rear of the table 12 and which includes a lower base 26, an upright arm 28 and a forwardly-directed upper arm 30. The upright arm 28 is provided with a pair of tracks 32 onto which is received a mounting arm 34. The mounting arm 34 includes an integral collar 36 and an integral horizontal flange 38 protruding from the collar 36. The collar 36 houses pairs of worm gears 40, each of which pairs is received in operative relation with one of the tracks 32 on the upright arm 28. A knob 42 is operatively connected via drive shaft 44 to one member of one pair of the worm gears 40 to permit the vertical positioning of the mounting arm 34 on the upright arm 28 to be adjusted as required, as described in more detail below, by rotation of the knob 42 in the appropriate direction.

This adjustable mounting arrangement is but one embodiment of the structure which may be employed. The adjustment to the height of the mounting arm 34 may be motor driven, with control of the motor being effected by buttons 43. The mounting arrangement employing the horizontal flange 38 may be replaced by any other convenient mounting device suitable for mounting the image projection and focussing device.

A mirror 44 is mounted to the upright arm 28 near the upper end thereof by a pair of arms 46 which are mounted to a pivot pin 48 running through the upright arm 28. A nut-and-bolt arrangement 50 supports the outer side of the mirror 44 from the forwardly-directed upper arm 30 and provides the mirror 44 in an approximately horizontal position. The provision of the mirror 44 pivoted about the upright arm 28 and the nut-and-bolt arrangement 50 enables the position of the mirror 44 to be adjusted to the desired reflecting position. The upright arm 28 may be provided with a series of pivot pin receiving openings 52 so that the vertical distance between the mirror 44 and the table 12 may be adjusted, as required.

An image projection and focussing device 54 is mounted to the mounting arm 34. The image projection device 54 comprises an upright mirrored mount 56 for receipt of a transparent film bearing a small-scale single-color representation or image 58 for projection by the image projection device 54. The image 58 is a one-color representation of the carton to be printed. The image projection device 54 further comprises an upright housing 60 facing the upright mount 56 and joined thereto by an integral horizontal flange 62 which is mounted to the mounting arm 34. The upright housing 60 has a lamp 64 mounted therein to shine light onto the image 58, which then is reflected by the mirrored mount 56.

The upright housing 60 also includes an opening 66 therethrough having a focussing lens therein to permit the image reflected from the mirrored mount 56 to pass therethrough and be focussed. The upright housing 60 also supports an angled mirror 68 on the opposite side of the opening 66 from the mirrored mount 56. The angled mirror 68 may be pivoted at 70 to permit angular adjustment relative to the upright housing 60.

The image projection and focussing device 54 is one convenient means for projecting the image 58 and focussing the same on the mirror 44 for reflection to the table 12. Any other convenient means may be employed. For example, a conventional overhead projector may be used with a focussing lens located in an area above the surface of the projector. Provision may be made for an adjustable focussing.

The image reflected by the mirrored mount 56 and passing through the lensed opening 66 in the upright housing 60 then is reflected by the mirror 68 upwardly to the mirror 44, from where the image is reflected back into the carrier sheet 20. A flexographic printing plate 72 is positioned on the carrier sheet 20 in accordance with the location of the projected image on the carrier sheet 20. The printing plate 72 is shown schematically as a rectangular block. This printing plate 72 generally comprises a plurality of individual flexographic printing elements attached to the carrier sheet 20 corresponding to the specific color image to be printed from such plate.

Figure 5:
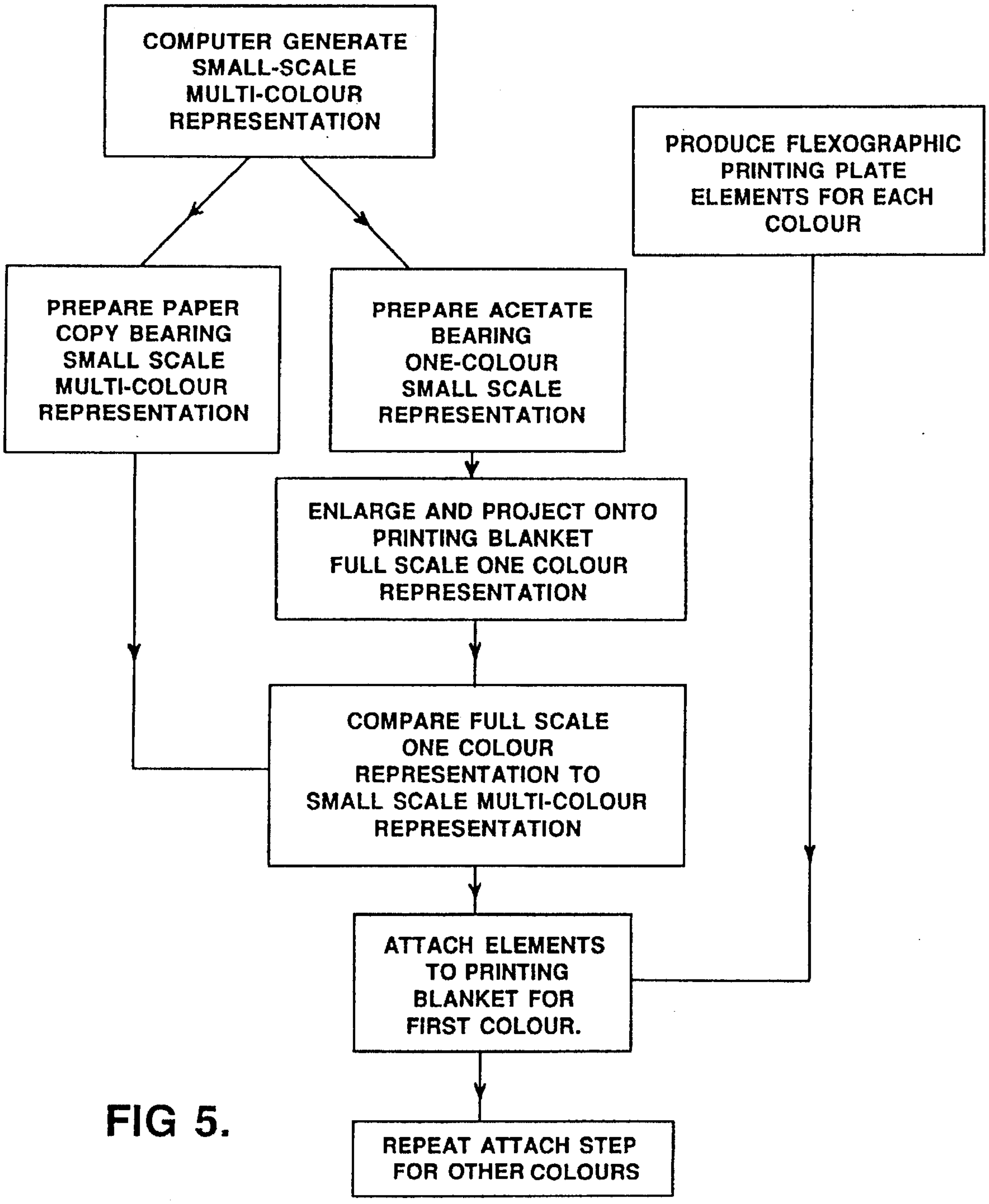
FIG. 5 is a schematic outline of the plate mounting procedure using the device illustrated in FIGS. 1 to 4.

In operation (see FIG. 5), the image 58 on the transparent film 59 is a black-and-white representation of a multi-color image to be printed onto a substrate, for example, a paperboard blank for forming into a carton. This image 58 also includes the dimensions of the carton and the outline of the carton blank and the score lines. The image 58 is computer generated from the specifications for the desired printed product.

The transparent film 59 bearing the image 58 is mounted on the mirror 56 and the image 58 is projected onto a carrier sheet 20 positioned on the table 12. The elements of the device 10 are dimensioned and positioned such that a full-scale black-and-white representation of the desired printed image is projected onto the carrier sheet 20.

The presence of required dimensions for the carton and the score lines and outline of the carton blank in the image 58 enables a check to be made that the correct full-scale of the desired printed image is provided. The vertical position of the image projecting and focussing device 54 may be adjusted on the upright arm 28 in order to compensate for any inaccuracy in the full-scale representation. One specific advantage of the adjustable vertical positioning of the image projecting and focussing device 54 is that it enables the same image 58 to be used if it is desired to scale-up or scale-down the dimensions of the printed image on the carton.

The mounter is provided with a plurality of flexographic printing plate elements corresponding to the printing to be provided on the carton and a colored-image template of the printed carton blank to enable the mounter to determine which of the printing plate elements is intended to print which color. The image projected onto the carrier sheet 20 in full-scale enables the mounter then to mount onto the carrier sheet the printing plate elements that correspond to one color to be printed. The process is repeated for other carrier sheets for each of the additional colors of the final printed image using the template.

A single printing plate, for a single color final image, or multiple number of printing plates for a multiple color final image, with printing plate elements appropriate for the individual color images, then are mounted to printing cylinders in a printing machine for printing the carton blank. By providing a blank-and-white projection of the desired printed carton blank on the carrier sheet 20, with built-in distortion as necessary to take into account the curvature of the printing cylinders, and a color template, the plate mounter is unerringly able to produce printing plates which contain the correct printing image elements for each color at the correct positioning on the carrier sheet, without the necessity for drawing out the outline of the printed carton and determining where each printing plate element is to be located.

The printing plate mounting device and procedure of the present invention, therefore, provides a versatile, accurate and simple plate mounting operation. The present invention enables printing plates to be mounted in a greatly-reduced mounting time using the projected full-scale image of the intended printed object.

SUMMARY OF DISCLOSURE

In summary of this disclosure, the present invention provides a novel printing plate mounter device and procedure which greatly reduces the time and cost of mounting printing plates. Modifications are possible within the scope of this invention.

What I claim is:

1. A method for the mounting of a one-color printing plate on a carrier sheet in a desired pattern corresponding to a one-color image desired to be printed on a recipient surface, which comprises:

providing a small-scale, single-color representation of a substrate and a complete at least single-color image to be printed thereon, providing printing plate elements for each color of said at least single-color image to be printed on said substrate, enlarging and projecting said small-scale representation onto a printing plate element recipient surface to provide a full-scale single-color projected representation of the substrate on said recipient surface, providing a small-scale at least single-color representation of the substrate and the complete at least single-color image to be printed thereon as a template to determine which of said printing plate elements is intended to print which color on the printed substrate, comparing the full-scale representation of the substrate and individual printing plate elements with the small-scale at least single-color representation, attaching to said recipient surface the individual printing plate elements for a first color in the location(s) shown by said projected full-scale representation and the small-scale at least single-color representation for printing such first color, and repeating said attaching step to further recipient surfaces for the individual printing plate element(s) for each additional color of the at least single-color image, thereby providing a plurality of recipient surfaces each bearing the printing plate elements for the specific color to be printed by such elements.

2. A printing plate mounting device, comprising:

means for projecting a small-scale single-color representation of a substrate and a complete at least single-color image to be printed thereon onto a printing plate element recipient surface to provide a full-scale single-color representation of the substrate and the image to be printed thereon.

3. The device of claim 2 wherein said recipient surface comprises a carrier sheet.

4. The device of claim 2 wherein said recipient surface is supported on a horizontal raised surface.

5. The device of claim 4 wherein said horizontal raised surface has a flat metal bar extending between the lateral extremities onto which said carrier sheet is hooked and an upwardly-directed centering projection received in an opening in said carrier sheet to center the carrier sheet on the raised surface.

6. The device of claim 5 wherein said horizontal raised surface has a pair of parallel flat metal bars at the lateral extremities having aligned upwardly-directed projections and wherein the longitudinal ends of the flat metal bar has openings therethrough to receive a selected pair of said aligned upwardly-directed projections.

7. The device of claim 4 wherein said projecting means comprises a reflective surface spaced above said horizontal raised surface and an image forming and focussing means below said reflective surface and focussed thereon.

8. The device of claim 7 wherein said image forming and focussing means comprises a light source, a support surface for a transparent film bearing said small-scale single-color representation of the substrate operatively located with respect to said light source to permit light to pass through said transparent film and a focussing lens located in a downstream location with respect to said light source and effective to focus the image projected by said transparent film onto said reflective surface.

9. The device of claim 8 wherein said image forming and focussing means is mounted on vertically movable support means.

* * * * *